Sept. 28, 1965          H. W. BOOK ETAL                3,209,241
          REGULATING AND CURRENT LIMITING TRANSFORMER SYSTEM
                        Filed June 13, 1962

United States Patent Office 3,209,241
Patented Sept. 28, 1965

3,209,241
REGULATING AND CURRENT LIMITING TRANSFORMER SYSTEM
Herbert W. Book and Arthur M. Lockie, Hickory Township, Mercer County, Pa., assignors to Westinghouse Electric Corporation, East Pittsburgh, Pa., a corporation of Pennsylvania
Filed June 13, 1962, Ser. No. 202,216
5 Claims. (Cl. 323—60)

This invention relates, generally, to electrical inductive apparatus and, more particularly, to transformers of a type having a capacitor formed within the transformer windings.

A transformer having a predetermined capacitance between different portions or sections of its winding is described in a copending application of H. W. Book Serial No. 172,916, filed February 13, 1962, and assigned to the same assignee as the present application. The sections of the transformer winding are so connected that the capacitance is effectively connected in series with the winding. Thus, the voltage drop across the capacitance varies with the current flowing in said winding.

An object of this invention is to improve the voltage characteristics or regulation of a transformer having capacitance between its windings.

Another object of this invention is to provide for limiting the short circuit current in a transformer during fault conditions.

A further object of the invention is to combine the features of good voltage regulation and current limitation in a transformer, thereby providing a distribution system having execellent voltage characteristics, but without the problem of handling severe fault currents.

Other objects of the invention will be explained fully hereinafter or will be apparent to those skilled in the art.

In accordance with one embodiment of the invention, a transformer having an effective series capacitance between its windings is constructed to have a relatively high leakage reactance, thereby having a relatively high percentage of inductive reactance or $IX_L$. The inductive reactance drop is compensated for under normal load conditions by providing sufficient capacitive reactance or $IX_C$, to produce the voltage regulation desired. A protective device is connected across the capacitor section of the transformer which remains open during normal load conditions, but shunts the capacitance quickly upon the occurrence of fault currents which would produce a dangerous $IX_C$ voltage. The protective device normally operates during the first half cycle of fault current. In this manner, a transformer is provided which can be constructed to have zero regulation, or better, during normal loading conditions, but in the presence of a fault current the characteristics of the transformer are changed to have a high inductive reactance to the fault current, thereby limiting the current to a safe value.

For a better understanding of the nature and objects of the invention, reference may be had to the following detailed description, taken in conjunction with the accompanying drawing, in which.

Figure 1:
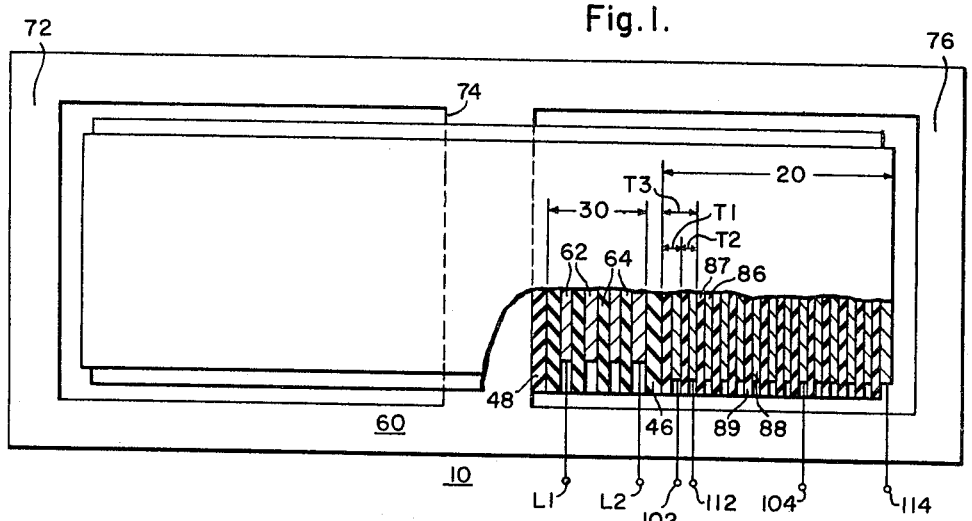
FIGURE 1 is a front elevational view, partly in section and partly schematic, of a transformer core and coil assembly embodying the principal features of the invention.

Referring now to the drawing, and particularly to FIG. 1, there is illustrated a transformer core and coil assembly 10 comprising a first or high voltage winding 20 and a second or low voltage winding 30 which are both inductively disposed on a magnetic core structure 60. As illustrated, the magnetic core 60 includes two substantially rectangular windows which are formed by the yoke portions of the magnetic core 60 and the first and second outer leg members 72 and 76, respectively, and a middle or winding leg member 74 on which the first and second windings 20 and 30, respectively, are inductively disposed. The winding leg member 74 is enclosed or surrounded by a supporting member, more specifically, a tube or barrier member 48 on which the first and second windings 20 and 30, respectively, are wound. The tube or barrier member 48 provides mechanical support for the first and second windings 20 and 30, respectively, and may be formed from electrically insulating material to insulate said windings from the winding leg member 74 of the magnetic core 60. Although the magnetic core 60 is illustrated as being of the single-phase shell form type, it is to be understood that the teachings of the invention may be incorporated in core and coil assemblies including magnetic cores of other types or configurations, such as those of the core form type.

Figure 2:
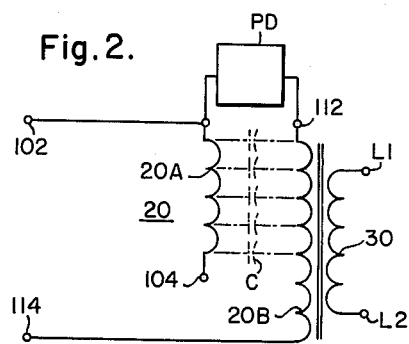
FIG. 2 is a schematic diagram of the transformer winding connections during normal loading conditions.
Figure 3:
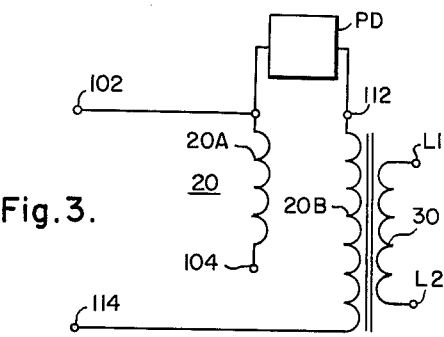
FIG. 3 is a schematic diagram of the transformer winding connections during fault current conditions.

In particular, the first or high voltage winding 20 comprises first and second winding portions or sections 20A and 20B, respectively, as best shown in FIGURES 1 and 2. The first winding section 20A of the winding 20 comprises a plurality of turns of a first layer of conducting sheet material 86 and a second layer of electrically insulating sheet material 87 which are generally spirally wound together about a portion of the magnetic core 60, more specifically the winding leg member 74. Similarly, the second winding section 20B of the winding 20 comprises a plurality of turns of a first layer of conducting sheet material 88 and a second layer of electrically insulating sheet material 89 which are generally spirally wound together about the same portion of the associated magnetic core 60. The width of the insulating sheet or film materials 87 and 89 are preferably greater than the corresponding width of the layers of conducting sheet or foil material 86 and 88, respectively, in order to provide additional "creep" insulation between the adjacent turns of the first winding 20. The conducting materials 86 and 88 and the insulating materials 87 and 89 are all of a general type in which the axial dimension of the materials is relatively large compared to the radial dimension. In other words, the width of each of the latter materials is relatively large compared to the thicknes of each of said materials.

Each turn of the first winding section 20A of the first winding 20, as indicated at T1, includes only a layer of the insulating material 87 and a layer of the conducting material 86, while each turn of the second winding section 20B includes only a layer of the insulating material 89 and a layer of the conducting material 88, as indicated at T2, with each layer of insulating material electrically insulating the adjacent layers of conducting materials from one another to provide the turn-to-turn insulation in the winding 20. It is to be understood, however, that in certain applications a layer of electrically insulating material may be provided on each side of each layer of conducting sheet material which makes up each of the turns of each of the winding sections 20A and 20B of the winding 20 so that each turn of each of the winding sections 20A and 20B would include two layers of electrically insulating material and one layer of conducting sheet material.

As illustrated, the second winding 30 includes a plurality of turns of a layer of conducting sheet or strip material 62 and a layer of electrically insulating sheet material 64 which are generally spirally wound together about the winding leg member 74 of the magnetic core 60. Each turn of the winding section 30 includes a layer of the insulating sheet or film material 64 and a layer of the conducting sheet or foil material 62. Similarly to the first winding 20 and for the same reasons, the width of the layer of insulating sheet material 64 of the second winding 30 is preferably greater than the width of the layer of conducting sheet material 62 which is included with the turn of the second winding 30.

In the assembly of the turns of the windings 20 and 30, the turns of the second winding 30 are first spirally wound on the tube or barrier member 48. The inner end or turn of the conducting sheet material 62 of the first winding section 30 is connected to the terminal L1. The outer end or turn of the layer of conducting sheet material 62 of the first winding 30 is connected to the terminal L2. It is to be understood that in certain applications, the winding 30 may include one or more winding sections formed from conducting material having a shape or cross-sectional configuration other than the preferred conducting sheet material as illustrated.

In order to electrically insulate the second or low voltage winding 30 from the first or high voltage winding 20, a tubular insulating member 46 is next assembled around the outside of the second winding 30. The insulating member 46 may be conveniently formed by winding a plurality of superimposed turns of an insulating sheet material having substantially the same width as the insulating sheet material 64. It is important to note that in a transformer coil and core assembly as disclosed, that the first or high voltage winding 20 may be fully insulated electrically from the second or low voltage winding 30 by the insulating member 46 which provides the winding-to-winding insulation.

In the assembly of the winding 20, the turns of the first and second winding sections 20A and 20B, respectively, are wound simultaneously in a portion of the overall core and coil assembly 10. Each turn of the combined first and second winding sections 20A and 20B, respectively, of the first winding 20 includes one layer of insulating sheet material 87, one layer of conducting sheet material 86, one layer of insulating sheet material 89 and one layer of conducting sheet material 88 and indicated at T3 in FIG. 1.

As described, the turns of the first winding section 20A of the winding 20 are wound simultaneously with at least a portion of the turns of the second winding section 20B of the winding 20 and are continuously interleaved with the adjacent turns of the second winding section 20B in a portion of the core and coil assembly for a purpose which will be explained hereinafter. The turns of the first section 20A, therefore, start and stop at first and second predetermined turns of the second winding section 20B of the first winding 20, the inner end turns of the first and second winding section 20A and 20B, respectively, being preferably disposed adjacent to one another for reasons which will be discussed hereinafter. In other words, the winding of the first or inner end turn of each of the first and second winding sections 20A and 20B of the winding 20 would preferably be started together or at the same time, as shown in FIG. 1, although the starting of the turns of the first winding section 20A may be delayed in certain applications.

Considering the connections of the first and second winding sections 20A and 20B, respectively, of the first winding 20 as shown in FIGURES 1 and 2, the inner end or turn of the conducting sheet material 86 of the first winding section 20A is connected to the terminal 102, while the outer end or turn of the layer of conducting sheet material 86 of the first winding section 20A is connected to the terminal 104. The inner end or turn of the layer of conducting sheet material 88 of the second winding section 20B of the winding 20 is connected to the terminal 112 while the outer end or turn of the layer of conducting material 88 is connected to the terminal 114. It is important to note that the outer end of the conducting sheet material 86 of the first winding section 20A, as indicated at the terminal 104, and the inner end or turn of the conducting sheet material 88 of the second winding section 20A, as indicated at the terminal 112, are not normally intended or adapted for direct external electrical connections to either an alternating current circuit or source (not shown) for reasons which will be discussed hereinafter.

The manner in which the first winding section 20A and the second winding section 20B of the first winding 20 are disposed or arranged with the adjacent turns of the respective winding sections being continuously interleaved has several important results. As best shown in FIGURE 2, there is illustrated a schematic diagram of the first and second windings 20 and 30, respectively, of the transformer core and coil assembly 10 shown in FIG. 1. Because of the insulating and conducting materials employed and the manner in which the turns of the first and second winding section 20A and 20B, respectively, of the first or high voltage winding 20 are continuously interleaved, a predetermined capacitance of the distributed type, as indicated at C in FIGURE 2, results between the adjacent turns of the first and second winding sections 20A and 20B, respectively. As shown in FIGURE 2, only the inner end or turn of the conducting sheet material 86, which forms the turns of the first winding section 20A, and the outer end or turn of the conducting sheet material 88, which forms the turns of the second winding section 20B, are adapted for direct electrical connections to an external alternating current or source, as indicated at the terminals 102 and 114. As previously stated, the terminals 104 and 112 are not adapted for physical or direct electrical connection to an external power source. The terminals L1 and L2 of the second or low voltage winding 30 are adapted to be connected to a load circuit (not shown).

It is important to note that the second winding section 20B of the first or high voltage winding 20 is adapted to be energized substantially entirely through the first winding section 20A of the winding 20 and the distributed capacitance C since any load current flowing from the first alternating current circuit connected to the terminals 102 and 114 would have to flow through a network formed by the combined turns of the first and second winding section 20A and 20B, respectively, of the first winding 20, as shown in FIG. 1, and the distributed capacitance C. Since the current through the distributed capacitance C varies with or is dependent upon the current which flows to a load (not shown) connected across the second winding 30 at the terminals L1 and L2 when a potential is applied to the terminals 102 and 114, the distributed capacitance C may be considered as a single lumped capacitance which is effectively connected in series with the first winding 20.

The effective value of the capacitance C provided between the adjacent turns of the first and second winding sections 20A and 20B, respectively, of the winding 20 varies with several factors. First, the capacitance C varies with the effective areas of the turns of the layers of conducting material 86 and 88 included in the first and second winding sections 20A and 20B, respectively, considered as electrodes. The capacitance C also varies with the dielectric constant, the thickness, and the effective areas of the layers of insulating sheet material 87 and 89 included with the first and second winding sections 20A and 20B considered as dielectric materials. Since the number of turns included in the first or high voltage winding 20 is normally much greater than the number of turns included in the second or low voltage winding 30, the required amount of capacitance C can be much more easily obtained than for the same value of capacitance provided between the adjacent turns of the first and second windings 20 and 30, respectively, by simply varying the number of turns included in the first winding section 20A of the first or high voltage winding 20 and thereby varying the effective length and area of the insulating sheet material which is common to the turns of the first and second winding section 20A and 20B.

In general, in the operation of the core and coil assembly 10, the capacitance C provided between the adjacent turns of the first and second winding section 20A and 20B can be designed to compensate for at least a portion of the voltage drop across the over-all impedance of said transformer core and coil assembly and even to compensate for a portion of the voltage drop in an associated feeder line connected between the transformer and a load.

The voltage regulation characteristic of a transformer of the type described hereinbefore may be represented by the formula:

Percent reg= percent $IR \cos \theta$+percent
$IX_L \sin \theta$—percent $IX_C \sin \theta$ In the above vector formula, percent IR is percent resistance drop in the transformer; percent $IX_L$ is percent inductive reactance drop; percent $IX_C$ is percent capacitive reactance drop produced by the capacitor section of the transformer and $\cos \theta$ is the power factor of the load current. Inspection of this formula will indicate that for a given level of regulation and percent IR that a direct relationship exists between percent $IX_L$ and percent $IX_C$.

The ideal transformer can be conceived by examining the above formula. Such a transformer should have zero or even possibly "negative" regulation (rising voltage characteristics) for normal loading, yet in the presence of fault current should reverse itself and have high regulation or current limiting characteristics.

Actually such a transformer is made possible by utilizing a structure of the type hereinbefore described in conjunction with a protective device PD of a type which is fully described and claimed in a copending application of A. H. B. Walker Serial No. 201,960, filed June 12, 1962, and assigned to the same assignee as the present application. In this arrangement the transformer is constructed to have a high leakage reactance which results in a high percent $IX_L$. This inductive reactance drop is then compensated for by the introduction of the necessary capacitance (percent $IX_C$) to produce the regulation desired.

As shown in FIGS. 2 to 6, inclusive, the protective device PD is connected across the capacitor C. The protective device is preferably of the static type and its characteristics are such that the device remains open or nonconductive during normal load conditions, but shunts the capacitance quickly upon the occurrence of fault currents which would produce a dangerous $IX_C$ voltage. The protective device normally operates during the first half cycle of fault current. As indicated in the schematic diagrams in FIGS. 2 and 3 and the equivalent circuit diagrams in FIGS. 4 and 5, when the protective device PD is open or nonconductive, the capacitance C is effective. When the protective device becomes conductive, the capacitance is shunted from the transformer circuit.

In this manner, a transformer is provided which during normal load condition may have zero regulation, or better yet in the presence of a fault current its characteristics are changed to provide a high inductive reactance to the fault current, thereby limiting the current to a safe value. Examination of the voltage formula confirms this, because when the protector operates during a fault current $IX_C$ becomes zero and the transformer voltage equation becomes:

Percent reg=percent $IR \cos \theta$+percent $IX_L \sin \theta$

As a practical matter, a transformer can be built with zero normal regulation, yet with 6% impedance to fault currents, thereby limiting the fault currents to about 16 times normal. Obviously, such a transformer has numerous advantages.

In addition to the voltage regulation feature and the protection against damage from fault currents another advantage of the present arangement results from the high $IX_C$ required to normally compensate for the high $IX_L$. First, at the higher voltage level it is easier to produce reliable, low cost protective devices for the capacitor section. Secondly, the high $IX_C$ is produced by a lower amount of capacitance as is evident from the formula:

$$X_C = \frac{1}{2\pi fC}$$

This results in additional economies in constructing the transformer.

Figure 6:
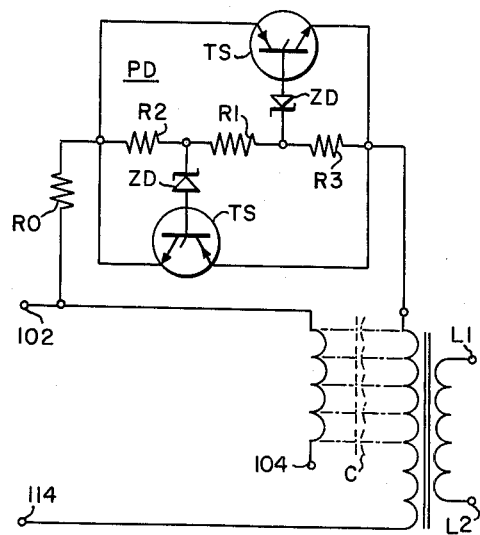
FIG. 6 is a schematic diagram showing a protective device connected across the capacitor section of the transformer.
Figure 4:
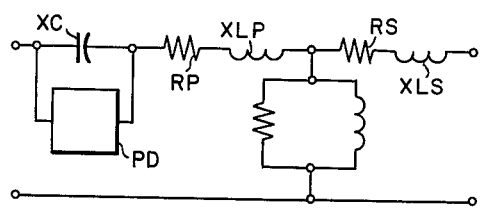
FIG. 4 is an equivalent circuit for the transformer under normal loading conditions.
Figure 5:
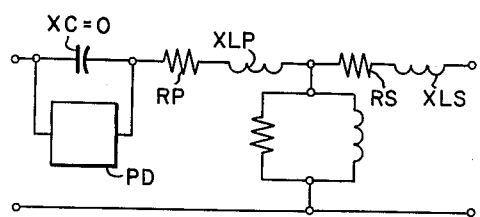
FIG. 5 is an equivalent circuit for the transformer under fault current conditions.

As stated previously, the protective device PD may be of the type described in the aforesaid copending Walker application. As shown in FIG. 6, the device comprises a resistor network, transistor switches or silicon controlled rectifiers TS and Zener diodes ZD. Under normal load conditions, the current flowing in the line and through capacitor C is such that the voltage developed across C, when attenuated by the resistor network $R_1$, $R_2$, $R_3$, is less than the knee or breakover voltage of the Zener diodes. At a predetermined level of current in C, the value of the voltage across C will exceed the Zener knee voltage and current will flow into the trinistor gates which will be fired and become conductive. This will ocur on each half cycle, both positive and negative, and, after firing, the voltage across C will fall to a value determined by the magnitude of the line current and the value of $R_0$. The resistor $R_0$ is utilized to limit the instantaneous current through the trinistors which would otherwise flow from C in the closed loop. The value of the voltage at which the protective device will become conductive can be readily predetermined by changing the values of the resistors $R_1$, $R_2$, and $R_3$. Normally $R_2$ and $R_3$ should be kept equal for reasons of symmetry during both half cycles. The trinistors and the Zener diodes are available commercially.

During a test of the device which proved satisfactory, the following resistance values were utilized:

$R_1$ was 5,000 ohms.
$R_2$ and $R_3$ were each approximately 80 ohms.
$R_0$ was 1 ohm.

The test was made on a 10 kva. transformer with a 2.5 kv. line voltage. When a short circuit was applied on the secondary winding, the capacitor voltage was limited to 500 volts and the protector circuit was undamaged.

From the foregoing description, it is apparent that the present invention provides for improving the voltage regulation of a transformer and for limiting short circuit currents during fault conditions. Furthermore, the transfomer is protected against damage which might otherwise result from fault conditions. A transformer of the type herein described may be readily and economically constructed.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a transformer for connecting to an alternating current source, in combination, a magnetic core, a winding disposed on said core for connecting to a load circuit, additional windings disposed on said core for connecting to the alternating current source and having a plurality of turns continuously interleaved to provide a capacitance between said additional windings, a protective device connected to said additional interleaved windings, said device being substantially non-conductive when the transformer is supplying a predetermined range of current to the load circuit from the alternating current source, said device becoming conductive during other predetermined current conditions to establish a shunt circuit around the capacitance.

2. In a transformer for connecting to an alternating current source and a load circuit, in combination, a magnetic core, a winding disposed on said core for connecting to the load circuit, additional windings disposed on said core for connecting to the alternating current source and having a plurality of turns continuously interleaved to provide a capacitance between said additional interleaved windings, a protective device connected across said capacitance, said device being responsive to a predetermined condition of said transformer to establish a shunt circuit around said capacitance.

3. A transformer having at least two high voltage windings and one low voltage winding constructed to have a predetermined leakage reactance, said high voltage windings being interleaved to provide a capacitance between the high voltage windings of the transformer to compensate for the inductive reactance drop caused by the leakage reactance under predetermined load conditions, a protective device connected across said capacitance, said protective device being responsive to a predetermined electrical condition of the transformer to establish a shunt circuit around said capacitance.

4. A transformer having a first winding and a second winding constructed to have a predetermined leakage reactance, said first winding comprising two sections interleaved to provide a capacitance between said winding sections to compensate for the inductive reactance drop caused by the leakage reactance under predetermined load conditions, a protective device connected across said capacitance, said protective device being non-conductive during predetermined load conditions, said protective device being responsive to a predetermined transformer condition to establish a shunt circuit around the capacitance.

5. In a transformer for connecting to an alternating current source, in combination, a magnetic core, a winding disposed on said core for connecting to a load circuit, at least two additional windings disposed on said core for connecting to the alternating current source and having a plurality of turns continuously interleaved to provide a capacitance between said additional windings, a static protective device having resistance connected to said additional interleaved windings to make the device substantially non-conductive when the transformer is supplying predetermined current to the load circuit, and semiconductors for shunting said resistance to make the protective device conductive during other predetermined current conditions to establish a shunt circuit around the capacitance.

References Cited by the Examiner

UNITED STATES PATENTS

| 2,521,513 | 9/50 | Gray | 336—165 X |
| 2,584,800 | 2/52 | Grisdale | 317—16 X |
| 2,703,852 | 3/55 | Meador | 317—16 X |
| 2,863,130 | 12/58 | Gray et al. | 336—180 X |
| 3,078,411 | 2/63 | Book | 323—43.5 |

OTHER REFERENCES

IBM Technical Disclosure Bulletin, Overvoltage Protective Circuit, by P. Essinger, vol. 2, No. 4, December 1959, page 96.

LLOYD McCOLLUM, *Primary Examiner.*